(12) United States Patent
Finlayson et al.

(10) Patent No.: US 9,129,388 B2
(45) Date of Patent: Sep. 8, 2015

(54) GLOBAL APPROXIMATION TO SPATIALLY VARYING TONE MAPPING OPERATORS

(71) Applicant: Apple Inc., Cupertino, CA (US)

(72) Inventors: Graham D. Finlayson, London (GB); Jakkarin Singnoo, Norwich (GB)

(73) Assignee: Apple Inc., Cupertino, CA (US)

( * ) Notice: Subject to any disclaimer, the term of this patent is extended or adjusted under 35 U.S.C. 154(b) by 198 days.

(21) Appl. No.: 13/683,020

(22) Filed: Nov. 21, 2012

(65) Prior Publication Data

US 2014/0140615 A1    May 22, 2014

(51) Int. Cl.
*G06K 9/00* (2006.01)
*G06T 5/00* (2006.01)

(52) U.S. Cl.
CPC ....... *G06T 5/009* (2013.01); *G06T 2207/20208* (2013.01)

(58) Field of Classification Search
None
See application file for complete search history.

(56) References Cited

U.S. PATENT DOCUMENTS

| | | | | |
|---|---|---|---|---|
| 6,167,165 A * | 12/2000 | Gallagher et al. | ............ | 382/263 |
| 8,515,196 B1 * | 8/2013 | Hogasten | .................... | 382/254 |
| 2008/0002904 A1 * | 1/2008 | Lyu et al. | ...................... | 382/266 |
| 2008/0131016 A1 * | 6/2008 | Kokemohr | .................... | 382/254 |
| 2008/0267494 A1 * | 10/2008 | Cohen et al. | ................. | 382/166 |
| 2009/0220169 A1 * | 9/2009 | Bennett et al. | ................ | 382/268 |
| 2010/0157078 A1 * | 6/2010 | Atanassov et al. | ......... | 348/222.1 |
| 2010/0166301 A1 * | 7/2010 | Jeon | ............................. | 382/162 |
| 2010/0177203 A1 * | 7/2010 | Lin | ............................ | 348/222.1 |
| 2010/0195901 A1 * | 8/2010 | Andrus et al. | ................ | 382/162 |
| 2011/0110601 A1 * | 5/2011 | Hong | ............................ | 382/255 |
| 2011/0188744 A1 * | 8/2011 | Sun | ............................ | 382/162 |
| 2011/0194618 A1 * | 8/2011 | Gish et al. | ............... | 375/240.25 |
| 2011/0229019 A1 * | 9/2011 | Batur et al. | ................... | 382/159 |
| 2011/0243473 A1 * | 10/2011 | Chen et al. | .................... | 382/274 |
| 2012/0170842 A1 * | 7/2012 | Liu et al. | ....................... | 382/167 |
| 2012/0206470 A1 * | 8/2012 | Frank et al. | ................... | 345/581 |
| 2012/0218442 A1 * | 8/2012 | Jandhyala et al. | ............ | 348/239 |
| 2012/0262600 A1 * | 10/2012 | Velarde et al. | ............ | 348/223.1 |
| 2013/0335438 A1 * | 12/2013 | Ward | ............................ | 345/589 |
| 2014/0002479 A1 * | 1/2014 | Muijs et al. | ................... | 345/589 |

OTHER PUBLICATIONS

"Tone Reproduction: A Perspective from Luminance-Driven Perceptual Grouping," Hwann-Tzong Chen et al, IEEE Computer Society Conference on Computer Vision and Pattern Recognition 2005, CVPR 2005, vol. 2, Jun. 20-25, 2005, pp. 369-376.*

(Continued)

*Primary Examiner* — Wenpeng Chen
(74) *Attorney, Agent, or Firm* — Blank Rome LLP (57) ABSTRACT

Techniques to generate global tone-mapping operators (G-TMOs) that, when applied to high dynamic range images, visually approximate the use of spatially varying tone-mapping operators (SV-TMOs) are described. The disclosed G-TMOs provide substantially the same visual benefits as SV-TMOs but do not suffer from spatial artifacts such as halos and are, in addition, computationally efficient compared to SV-TMOs. In general, G-TMOs may be identified based on application of a SV-TMO to a down-sampled version of a full-resolution input image (e.g., a thumbnail). An optimized mapping between the SV-TMO's input and output constitutes the G-TMO. It has been unexpectedly discovered that when optimized (e.g., to minimize the error between the SV-TMO's input and output), G-TMOs so generated provide an excellent visual approximation to the SV-TMO (as applied to the full-resolution image).

27 Claims, 6 Drawing Sheets

(56) References Cited

OTHER PUBLICATIONS

"Photography Enhancement Based on the Fusion of Tone and Color Mappings in Adaptive Local Region," Te-Hsun Wang et al , IEEE Transactions on Image Processing, vol. 19, No. 12, Dec. 2010, pp. 3089-3105.*

"Optimal Contrast Enhancement for Tone-mapped Low Dynamic Range Images based on High Dynamic Range Images," Ka-Yue Yip et al, IEEE Pacific Rim Conference on Communications, Computers and Signal Processing, 2009, Aug. 23-26, 2009, pp. 53-58.*

* cited by examiner

GLOBAL APPROXIMATION TO SPATIALLY VARYING TONE MAPPING OPERATORS

BACKGROUND

This disclosure relates generally to the field of image processing and, more particularly, to techniques for generating global tone-mapping operators (aka tone mapping curves).

High Dynamic Range (HDR) images are formed by blending together multiple exposures of a common scene. Use of HDR techniques permit a large range of intensities in the original scene to be recorded (such is not the case for typical camera images where highlights and shadows are often clipped). Many display devices such as monitors and printers however, cannot accommodate the large dynamic range present in a HDR image. To visualize HDR images on devices such as these, dynamic range compression is effected by one or more Tone-Mapping Operators (TMOs). In general, there are two types of TMOs: global (spatially-uniform) and local (spatially-varying).

Global TMOs (G-TMOs) are non-linear subjective functions that map an input HDR image to an output Low Dynamic Range (LDR) image. G-TMO functions are typically parameterized by image statistics drawn from the input image. Once a G-TMO function is defined, every pixel in an input image is mapped globally (independent from surrounding pixels in the image). By their very nature, G-TMOs compress or expand the dynamic range of the input signal (i.e., image). By way of example, if the slope of a G-TMO function is less than 1 the image's detail is compressed in the output image. Such compression often occurs in highlight areas of an image and, when this happens, the output image appears flat; G-TMOs often produce images lacking in contrast.

Spatially-varying TMOs (SV-TMOs) on the other hand, take into account the spatial context within an image when mapping input pixel values to output pixel values. Parameters of a nonlinear SV-TMO function can change at each pixel according to the local features extracted from neighboring pixels. This often leads to improved local contrast. It is known, however, that strong SV-TMOs can generate halo artifacts in output images (e.g., intensity inversions near high contrast edges). Weaker SV-TMOs, while avoiding such halo artifacts, typically mute image detail (compared to the original, or input, image). As used herein, a "strong" SV-TMO is one in which local processing is significant compared to a "weak" SV-TMO (which, in the limit, tends toward output similar to that of a G-TMO). Still, it is generally recognized that people feel images mapped using SV-TMOs are more appealing than the same images mapped using G-TMOs. On the downside, SV-TMOs are generally far more complicated to implement than G-TMOs. Thus, there is a need for a fast executing global tone-mapping operator that is able to produce appealing output images (comparable to those produced by spatially variable tone-mapping operators).

SUMMARY

In one embodiment the inventive concept provides a method to convert a high dynamic range (HDR) color input image to a low-dynamic range output image. The method includes receiving a HDR color input image, from which a brightness or luminance image may be obtained, extracted or generated. The grayscale image may then be down-sampled to produce, for example, a thumbnail representation of the original HDR color input image. By way of example, the HDR input image may be an 8, 5 or 3 megapixel image while the down-sampled grayscale image may be significantly smaller (e.g., 1, 2, 3 or 5 kilobytes). A spatially variable tone mapping operator (SV-TMO) may then be applied to the down-sampled image to produce a sample output image. A mapping from the grayscale version of the output image to the sample output image may be determined—generating a global tone mapping operator (G-TMO). It has been discovered that this G-TMO, when applied to the full resolution grayscale version of the HDR color input image, produces substantially the same visual result as if the SV-TMO was applied to the full resolution grayscale image. This is so even thought it's generation was based on a down-sampled image and which, as a result, have significantly less information content. In one embodiment the resulting low dynamic range (LDR) grayscale image may be used. In another embodiment the resulting LDR grayscale image may have detail restoration operations applied and then used. In yet another embodiment, the resulting LDR grayscale image may have both detail and color restoration operations applied. In still another embodiment, the generated G-TMO may undergo smoothing operations prior to its use. In a similar manner, an unsharp mask may be applied to the resulting LDR image.

Methods in accordance with this disclosure may be encoded in any suitable programming language and used to control the operation of an electronic device. Illustrative electronic devices include, but are not limited to, desktop computer systems, notebook computer systems, tablet computer systems, and other portable devices such as mobile telephones and personal entertainment devices. The methods so encoded may also be stored in any suitable memory device (e.g., non-transitory, long-term and short term electronic memories).

DETAILED DESCRIPTION

This disclosure pertains to systems, methods, and computer readable media for generating global tone-mapping operators (G-TMOs) that, when applied to high dynamic range (HDR) images, generate visually appealing low dynamic range (LDR) images. The described G-TMOs provide substantially the same visual benefits as spatially varying tone-mapping operators (SV-TMOs) but do not suffer from spatial artifacts such as halos and are, in addition, computationally efficient to implement compared to SV-TMOs. In general, techniques are disclosed in which a G-TMO may be identified based on application of a SV-TMO to a down-sampled version of a full-resolution input image (e.g., a thumbnail). More specifically, a mapping between the SV-TMO's input (i.e., the down-sampled input image) and output constitutes the G-TMO. It has been unexpectedly discovered that when optimized (e.g., to minimize the error between the SV-TMO's input and output), G-TMOs so generated may be applied to the full-resolution HDR input image to provide an excellent visual approximation to the SV-TMO (as applied to the full-resolution image).

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

Figure 1:
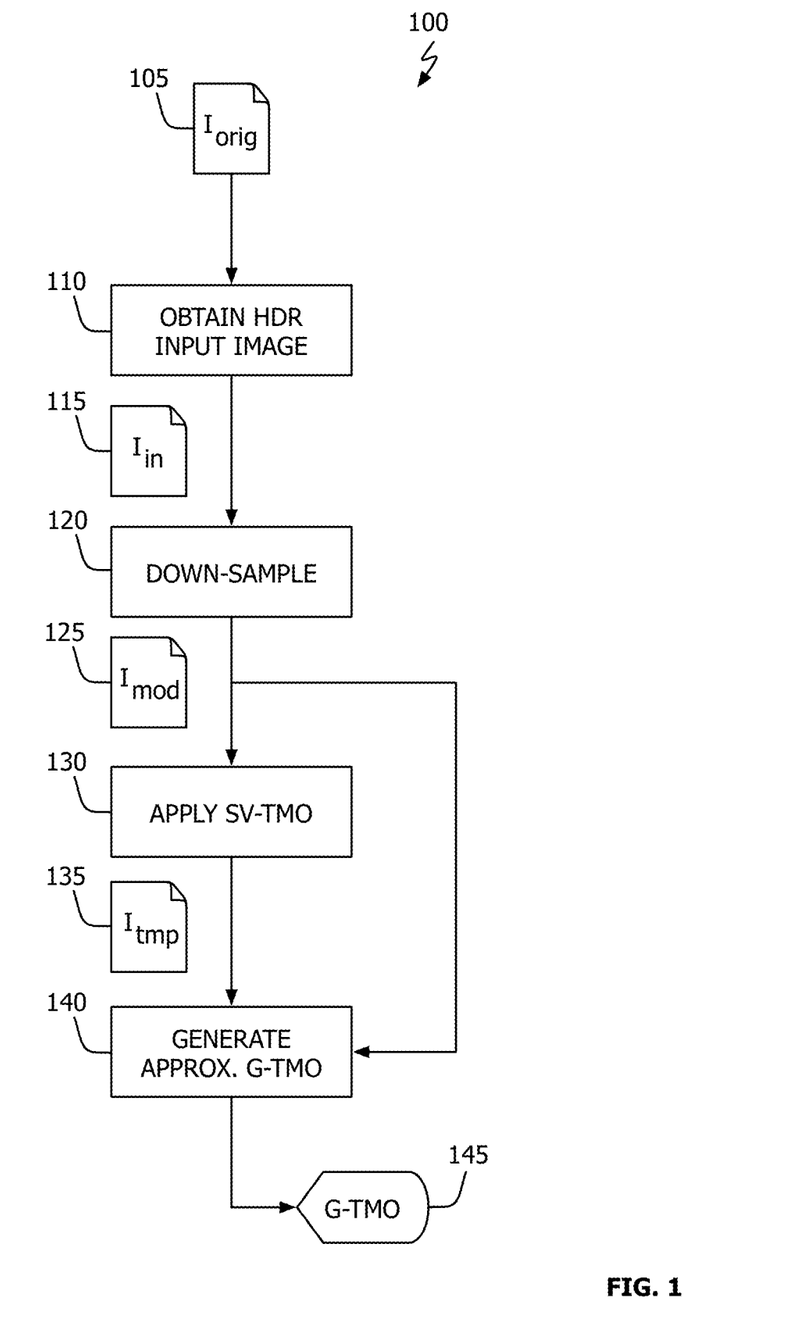
FIG. 1 shows, in flowchart form, a G-TMO operation in accordance with one embodiment.

Referring to FIG. 1, G-TMO generation process 100 in accordance with one embodiment obtains original full-resolution HDR color image $I_{orig}$ 105 and converts it to input image $I_{in}$ 115 (block 110). In practice, input image 115 may be a luminance or brightness image counterpart to HDR color image 105 (e.g., the luma channel of image 105). Input image 115 may then be down-sampled to generate modified input image $I_{mod}$ 125 (block 120). Modified input image 125 could be, for example, a thumbnail version of input image 115. Often, modified input image 125 can be significantly smaller than HDR input image 115. For example, if HDR input image 115 is an 8 megabyte image, modified input image 125 may be as small as 3-5 kilobytes. A SV-TMO may then be applied to modified input image 125 to generate temporary image $I_{tmp}$ 135 (block 130). The particular SV-TMO applied will be chosen by the system designer according to the desired "look" they are attempting to achieve. Here, temporary image 135 represents a LDR version of modified image input 125. Both modified input image 125 and temporary image 135 may be used to generate optimized G-TMO 145—an approximation to the SV-TMO applied in accordance with block 130 (block 140). Once generated, G-TMO 145 may be used to convert original color HDR image 105 into a LDR output image suitable for display or other use (see discussion below).

It should be noted, optimal G-TMO 145 is not generally an arbitrary function. Rather, G-TMO 145 is typically monotonically increasing both to avoid intensity inversions and to allow image manipulations to be undone. (Most tone curve adjustments made to images such as brightening, contrast changes and gamma are monotonically increasing functions.) Thus, in accordance with one embodiment, operation 140 seeks to find a one-dimensional (1-D) surjective and monotonically increasing function that best maps modified input image 125 to temporary image 135. While not necessary to the described methodologies, input data values will be assumed to be in the log domain (e.g., HDR image 125 and LDR image 135 pixel values). This approach is adopted here because relative differences are most meaningful to human observers whose visual systems have approximately a log response and, practically, most tone mappers (hardware and/or software) use the log of their input image as input.

Returning to FIG. 1, in one embodiment operations in accordance with block 140 minimize the error in mapping two-dimensional images having 'n' pixels where $X'_i$ represents the i-th pixel of the input to operation 140 (i.e., modified input image 125), $Y'_i$ the corresponding i-th pixel of the target output image (i.e., temporary image 135), by a monotonically increasing function $\hat{m}()$. To find $\hat{m}()$, consider the relationship between corresponding input and output pixel brightness values. Thus, pixels tuples $(X'_i, Y'_i)$ may be sorted according to $X'_i$. For example, a 3 pixel input-output paired image having pixel tuples (1, 4), (0, 5), and (2, 3) may be sorted in accordance with this approach to (0, 5), (1, 4) and (2, 3). Note, image X pixel values are in ascending order. For ease of notation, the X-sorted pixel tuples may be denoted $(X_i, Y_i)$—without the apostrophes. Given this background, $\hat{m}()$ is the function that minimizes:

$$\sum_{i=1}^{n} (Y_i - \hat{m}(X_i))^2 \qquad \text{EQ. 1}$$

subject to $\hat{m}(X_1) \leq \hat{m}(X_2) \leq \ldots \leq \hat{m}(X_n)$. In the embodiment represented by EQ. 1, the mapping error noted above is minimized in a root mean squared error (RMSE) sense. A designer may use whatever minimization technique they deem appropriate for their particular. For example, monotonically increasing function $\hat{m}()$ may be found using Quadratic Programming (QP), where QP is an optimization technique for finding the solution to a sum of square objective function (e.g., EQ. 1) subject to linear constraints (e.g., monotonic increasing). A QP solution can have the advantage that it permits "almost" monotonically increasing G-TMOs to be found. Another approach to minimizing EQ. 1 may use the Pool Adjacent Violators Algorithm (PAVA).

Figure 2:
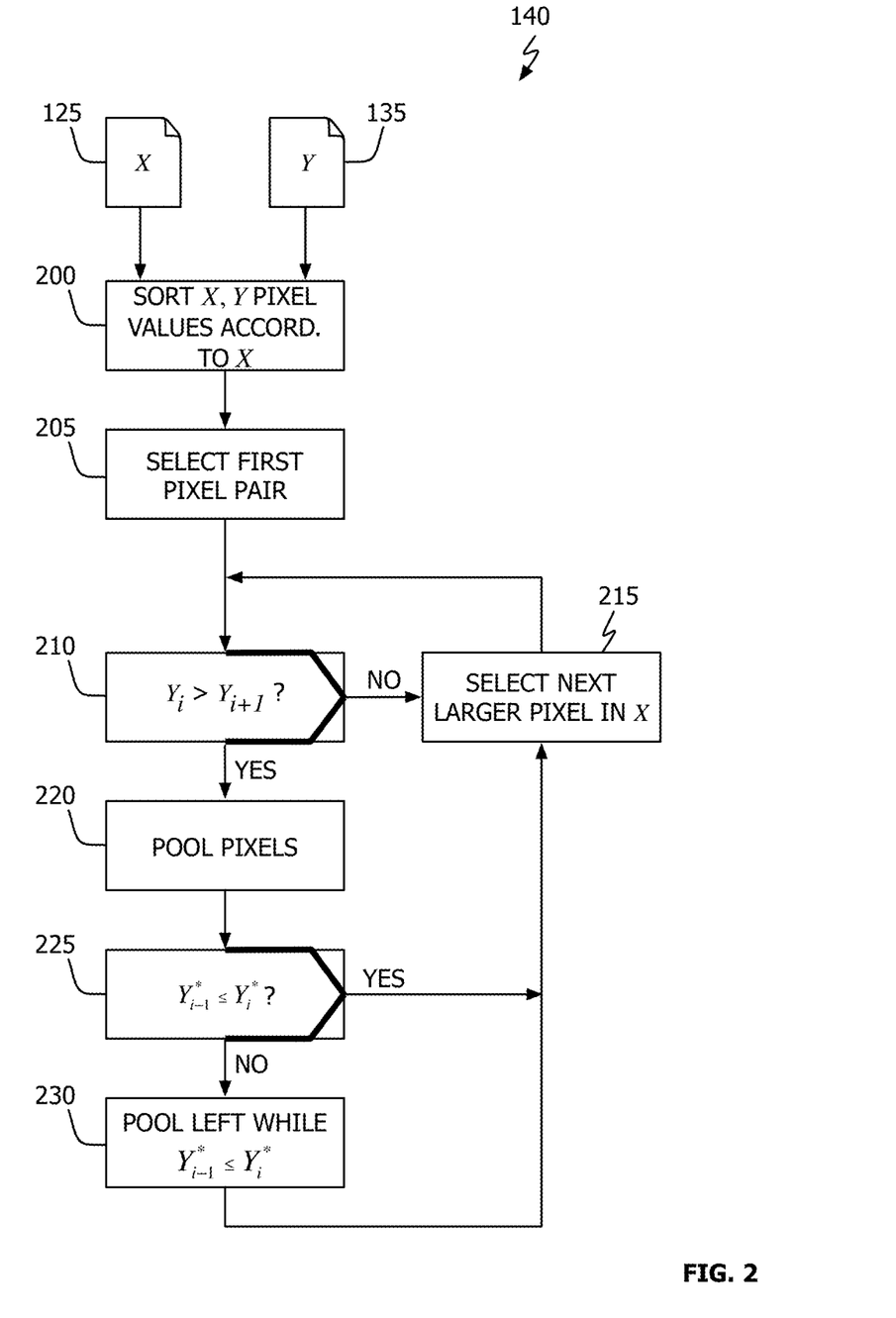
FIG. 2 shows, in flowchart form, one illustrative G-TMO operation in accordance with this disclosure.

Referring to FIG. 2, G-TMO operations in accordance with block 140 using PAVA to find that $\hat{m}()$ that minimizes EQ. 1 may begin by sorting the pixels values in modified image 125 (hereinafter, X) in ascending order which, also, orders the corresponding pixels in temporary image $I_{tmp}$ 135 (hereinafter, Y)—although not necessarily in ascending order (block 200). The smallest pixel value in X may then be selected—i.e., the "left-most" pixel value in the sorted list of pixel values (block 205), whereafter a check may be made to determine if the corresponding Y pixel value violates the constraint $Y_i > Y_{i+1}$ (block 210). If the constraint is not violated (the "NO" prong of block 210), the next largest X image pixel value may be selected (block 215), whereafter the check of block 210 may be repeated. If the monotonicity constraint is violated (the "YES" prong of block 210), the pixel values reviewed up to this point may be pooled together, replacing them with their average, $Y^*_i$ (block 220):

$$Y^*_i = (Y_i + Y_{i-1} + \ldots + Y_i) \div n,$$

where 'n' represents the number of pixel values being pooled.

Following block 220, another check may be made to determine whether the average Y image pixel value ($Y^*_i$) is larger than the preceding Y image pixel value ($Y_{i-1}$) (block 225). If it is (the "YES" prong of block 225), the net largest X pixel value may be selected (block 215), whereafter operation 140 continues at block 210. If, on the other hand, $Y^*_{i-1}$ is not less than or equal to $Y^*_i$ (the "NO" prong of block 225), pixel values to the "left" of the current pixel may be pooled together, replacing them with their average, $Y^*_i$ (block 230). Acts in accordance with block 230 may continue to pool to the left until the monotonicity requirement of block 225 is violated.

In the end, operation 140 yields $\hat{m}()$ which, from EQ. 1, gives us approximated optimal G-TMO 145. It has been found, quite unexpectedly, that G-TMO 145 may be used to approximate the use of a SV-TMO on the full-resolution HDR grayscale input image (e.g., input image 115)—this is so even though its' development was based on a down-sampled input image (e.g., a thumbnail). As a consequence, HDR-to-LDR conversions in accordance with this disclosure can enjoy the benefits of SV-TMOs (e.g., improved local contrast and perceptually more appealing images) without incurring the computational costs (SV-TMOs are generally far more complicated to implement than G-TMOs), intensity inversions near high contrast edges (i.e., halos), and muted image detail typical of SV-TMOs. It has been discovered that, in practice, use of a SV-TMO on a down-sampled version of a full-resolution HDR input image (i.e., a thumbnail) to develop a G-TMO that optimally approximates the SV-TMO, is significantly easier to implement and uses less computational resources (e.g., memory and processor time) than application of the same SV-TMO directly to the full-resolution HDR input image.

In one embodiment, G-TMO 145 may be applied directly to full-resolution grayscale image $I_{in}$ 115. It has been found, however, that results obtained through the application of PAVA are sensitive to outliers. Outliers can cause PAVA to produce results (i.e., tone mapping operators or functions) whose outputs exhibit long flat portions; the visual meaning is that a range of input values are all mapped to a common output value, with a potential loss of detail as a result. Thus, even though the basic PAVA solution may be optimal in terms of a RMSE criteria, flat regions in a tone curve (e.g., G-TMO 145 output) can result in visually poor quality images. It has been found that a smoothed PAVA curve has almost the same RMSE as a fully optimal tone mapping operator (e.g., a non-smoothed G-TMO) and does not exhibit flat output regions.

Figure 3:
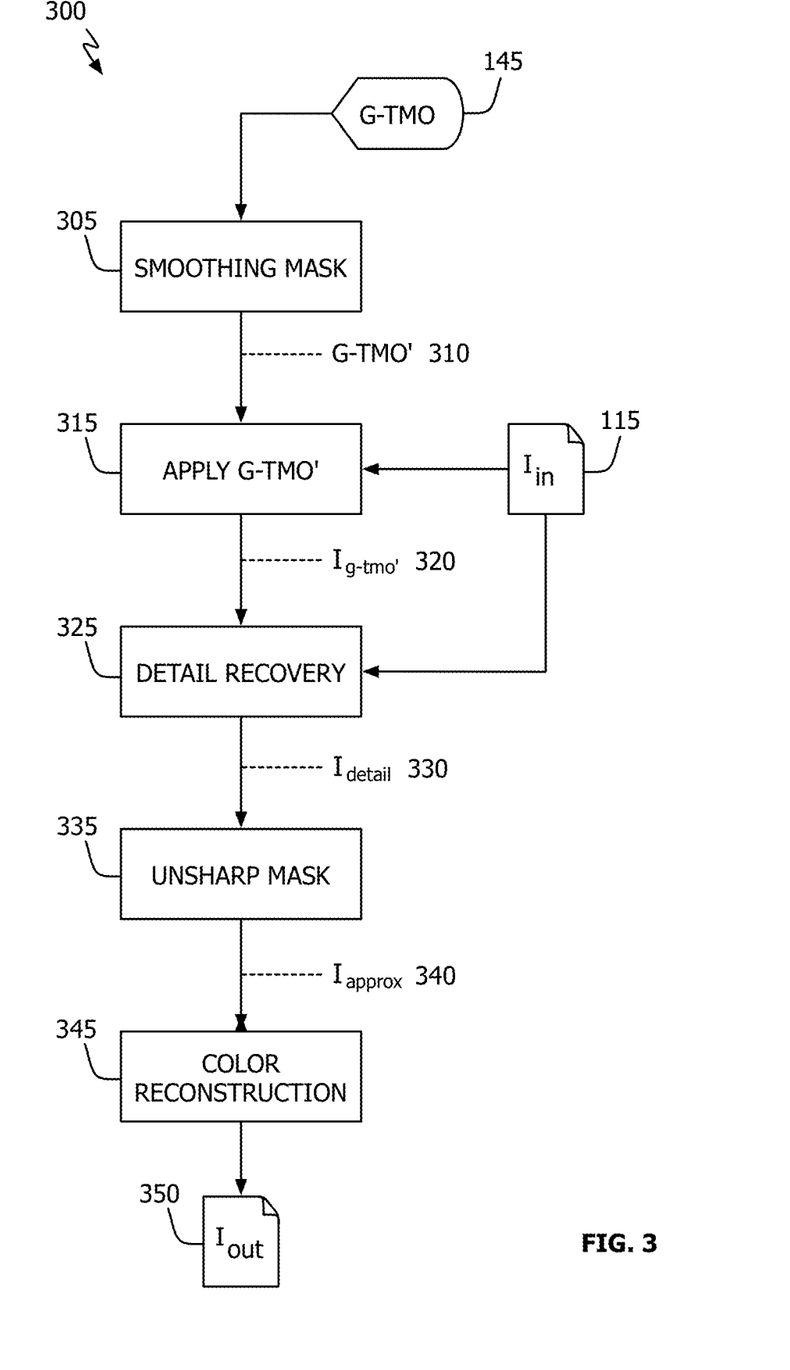
FIG. 3 shows, in flowchart form, an image enhancement operation in accordance with one embodiment.

Referring to FIG. 3, HDR-to-LDR image operation 300 based on this recognition applies a smoothing mask or filter to G-TMO 145 to produce G-TMO' 310 (block 305). G-TMO' 310 may then be applied to input image $I_{in}$ 115 (e.g., a full-resolution HDR grayscale version of original HDR color input image $I_{orig}$ 105) may then be applied to produce G-TMO' image $I_{g\text{-}tmo}$, 320 (block 315). It will be recognized that application of tone mapping operators can lead to a loss of detail in the final image. Accordingly, detail recovery operations may be applied to G-TMO' image 320 and input image 115 to generate recovered detail image $I_{detail}$ 330 in which the detail of the input image has been at least partially recovered (block 325). In one embodiment, high frequency detail may be incorporated into G-TMO' image 320 by computing:

$$I_{detail} = I_{in} + BF(I_{in}, I_{g\text{-}tmo} - I_{in}), \quad \text{EQ. 3}$$

where $BF()$ represents a bilateral filter operation. As used here, a bilateral filter calculates a local average of an image where the average for an image pixel $I(x,y)$ weights neighboring pixels close to x and y more than pixels further away. Often the averaging is proportional to a 2-dimensional symmetric Gaussian weighting function. Further, the contribution of a pixel to the local average is proportional to a photometric weight calculated as $f(I(x, y), I(x',y'))$, where $f()$ returns 1 when the pixel values at locations $(x', y')$ and $(x, y)$ are similar. If $(x', y')$ and $(x, y)$ are dissimilar, $f()$ will return a smaller value and 0 if the pixel values differ too much. In one embodiment pixel similarity may be calculated according to an 'auxiliary' image. For example, if the 'red' channel of a color image is bilaterally filtered the photometric distance might be measured according to a luminance image. Thus, the notation $BF(I_1,I_2)$ signifies $I_2$ is 'spatially averaged' according to auxiliary image $I_1$.

While an image generated by G-TMO' 310 may be similar to an image produced by a SV-TMO, it can look flat—especially in highlight region areas (where the best global tone-curve has a derivative less than 1). An unsharp mask can often ameliorate this problem—application of which produces approximate output image $I_{approx}$ 340 (block 335). Substantially any operator which enhances edges and other high frequency components in an image may be used in accordance with block 335.

Because G-TMO' 310 is applied to a brightness image (e.g., input image $I_{in}$ 115), to generate LDR color output image $I_{out}$ 350 requires color reconstruction operations (block 345). In one embodiment, color reconstruction—for each pixel—may be provided as follows:

$$C_{out} = \left(\frac{L_{out}}{L_{in}}\right) C_{in}, \quad \text{EQ. 4}$$

where $C_{out}$ represents one of the color channels (e.g., red, green, or blue) in LDR color output image $I_{out}$ 350, $C_{in}$ represents the color value for the corresponding pixel in original color HDR image $I_{orig}$ 105, and $L_{in}$ represents the luminance values before operation 315 is applied and $L_{out}$ represents pixel values after unsharp mask operation 345.

Determination of G-TMO 145 even when based on a down-sampled image can be a computationally expensive operation. To reduce this cost, a PAVA operation such as that described above with respect to block 140 (see FIGS. 1 and 2) may be quantized. By way of example, suppose there are n+1 quantization levels of X such that $X_i$ is mapped to the closest of (n+1) values $q_n, g_{n-1}, \ldots g_0$. If the minimum log-value is M, let $g_i=(i\div n)M$. For each quantization level there may be many different output values. The complexity of PAVA, however, is bounded by the n quantization levels (say 32, 64 OR 128 compared with the millions of pixels that typically comprise original HDR image 105). Using this approach, PAVA values may be calculated for only $X_i=g_i$ and the corresponding output Y (again, a single quantization level can have many different output values). Because original HDR color image 105 is not quantized, generation of output image $I_{out}$ 345 requires that some output values must likely be determined via interpolation (e.g., linear or bicubic). For an arbitrary X (a pixel brightness value from input image 115 whose brightness is between quantization levels u and u+1), one appropriate inter-quantization brightness level may be given as follows:

$$a = \frac{X - q_u}{q_{u+1} - q_u}. \quad \text{EQ. 5}$$

If it is assumed that the G-TMO's final output value is to be the same linear combination of these quantization levels, then:

$$\hat{m}(X) = (1-a)\hat{m}(q_n) + a\,\hat{m}(q_{n+1}).$$

Figure 4:
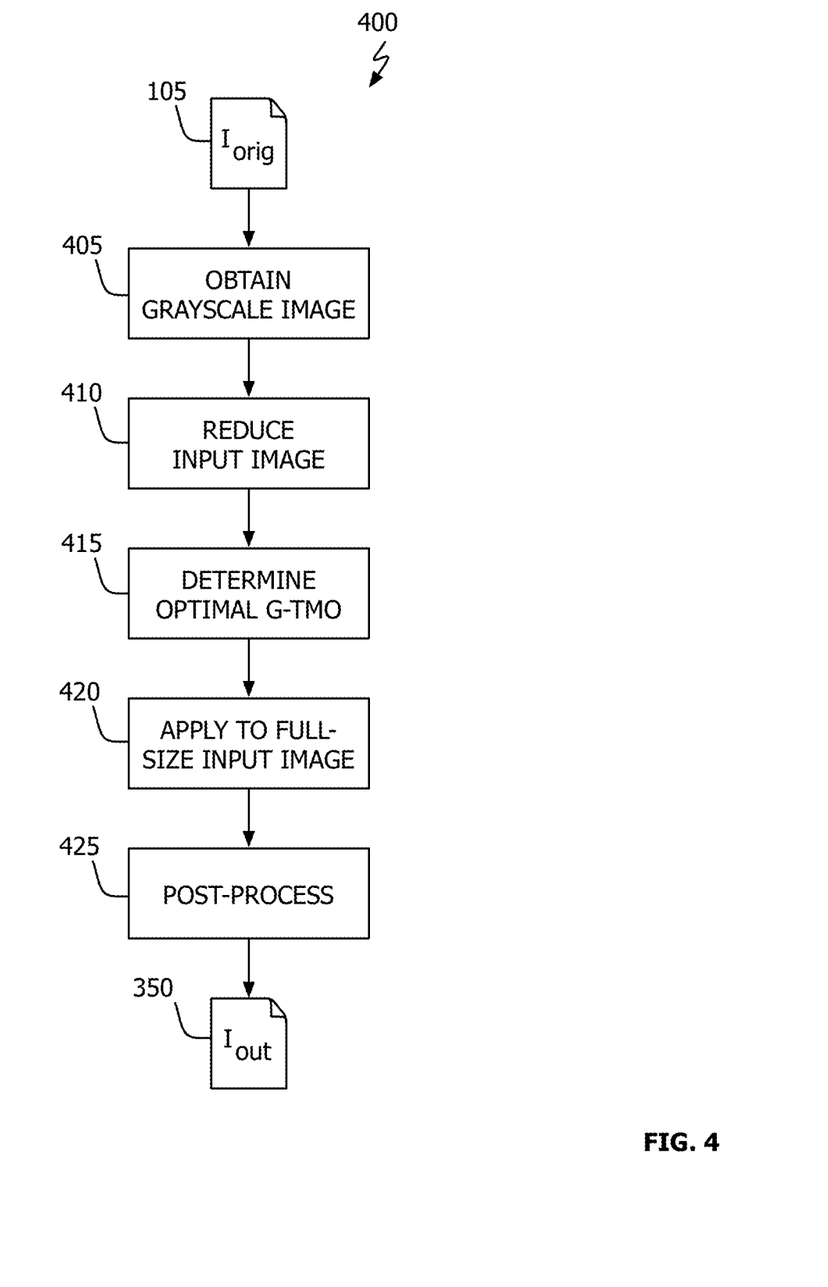
FIG. 4 shows, in flowchart form, an image enhancement operation in accordance with another embodiment.

Referring to FIG. 4, operations in accordance with FIGS. 1-3 may be summarized by image enhancement process 400. First, full-color HDR image 105 may be used to generate a full-resolution HDR grayscale image (block 405) and, thereafter, reduced to, for example, a thumbnail image (block 410). A global tone-mapping operator may then be determined as discussed herein (block 415). Acts in accordance with block 415 may include, for example, the use of quantization levels and/or smoothing filters. Once determined, the G-TMO may be applied to the grayscale version of the full-resolution input image 105 (block 420), whereafter various post-application processes may be applied such as unsharp masks, detail recovery and color reconstruction (block 425) so as to generate final LDR color output image 350. As noted above, it has been unexpectedly discovered that a G-TMO based on a reduced size (down-sampled) input image may be applied to the corresponding full-resolution input, and that doing so provides substantially the same visual benefits as a spatially varying tone-mapping operator but does not suffer from spatial artifacts such as halos. In addition, because all operations are performed on a down-sampled image, generation of a G-TMO in accordance with this disclosure is computationally efficient compared to application of SV-TMOs. That latter benefit may be further enhanced through the use of quantization levels.

Figure 5:
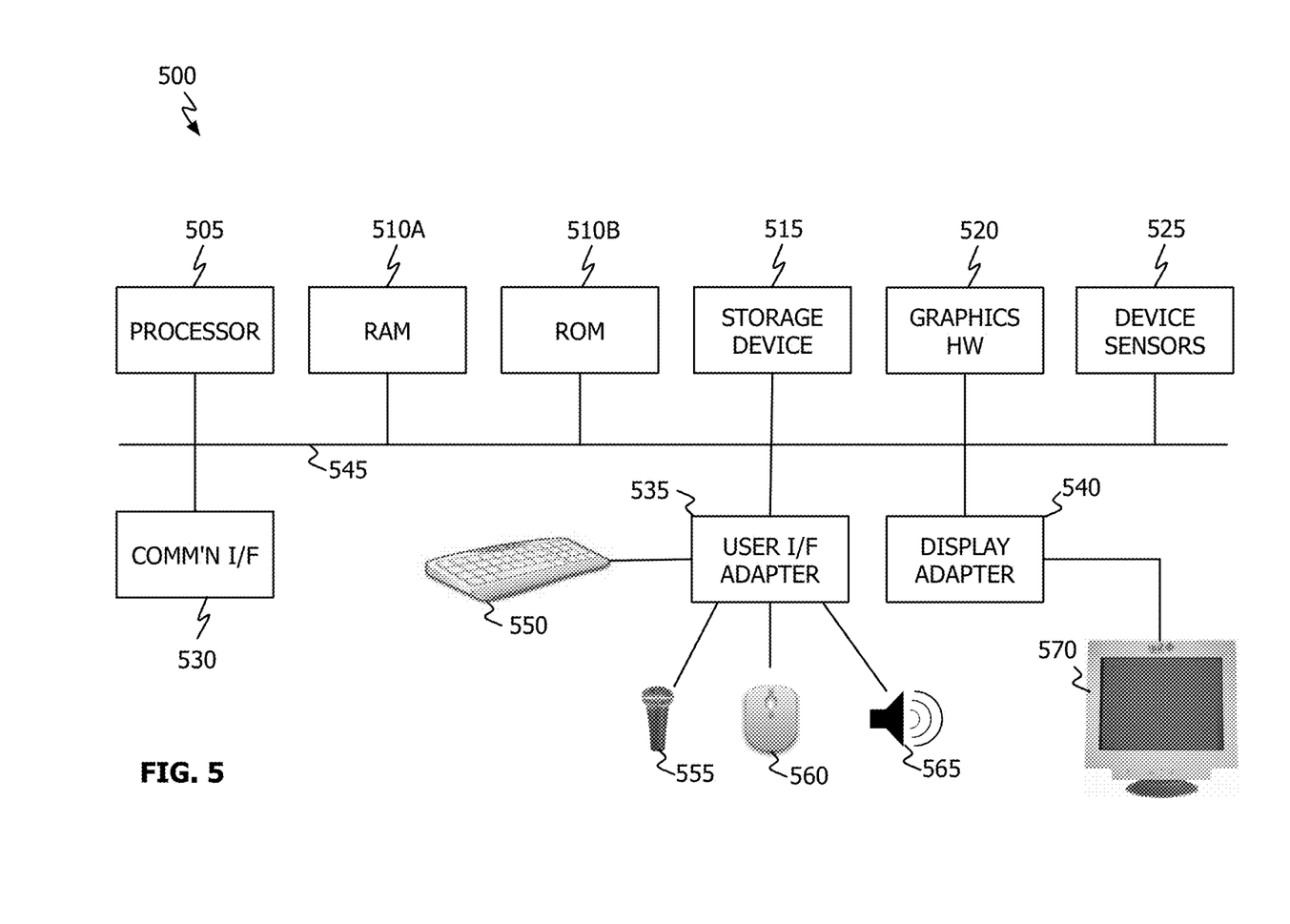
FIG. 5 shows, in block diagram form, a computer system in accordance with one embodiment.

Referring to FIG. 5, representative computer system 500 (e.g., a general purpose computer system or a dedicated image processing workstation) may include one or more processors 505, memory 510 (510B and 510B), one or more storage devices 515, graphics hardware 520, device sensors 525 (e.g., proximity sensor/ambient light sensor, accelerometer and/or gyroscope), communication interface 530, user interface adapter 535 and display adapter 540—all of which may be coupled via system bus or backplane 545. Memory 510 may include one or more different types of media (typically solid-state) used by processor 505 and graphics hardware 520. For example, memory 510 may include memory cache, read-only memory (ROM), and/or random access memory (RAM). Storage 515 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 510 and storage 515 may be used to retain media (e.g., audio, image and video files), preference information, device profile information, computer program instructions organized into one or more modules and written in any desired computer programming language, and any other suitable data. When executed by processor 505 and/or graphics hardware 520 such computer program code may implement one or more of the methods described herein. Communication interface 530 may be used to connect computer system 500 to one or more networks. Illustrative networks include, but are not limited to: a local network such as a USB network; a business' local area network; or a wide area network such as the Internet and may use any suitable technology (e.g., wired or wireless). User interface adapter 535 may be used to connect keyboard 550, microphone 555, pointer device 560, speaker 565 and other user interface devices such as a touchpad and/or a touch screen (not shown). Display adapter 540 may be used to connect one or more display units 570.

Processor 505 may be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 process graphics information. In one embodiment, graphics hardware 520 may include one or more programmable graphics processing unit (GPU) and other graphics-specific hardware (e.g., custom designed image processing hardware).

Figure 6:
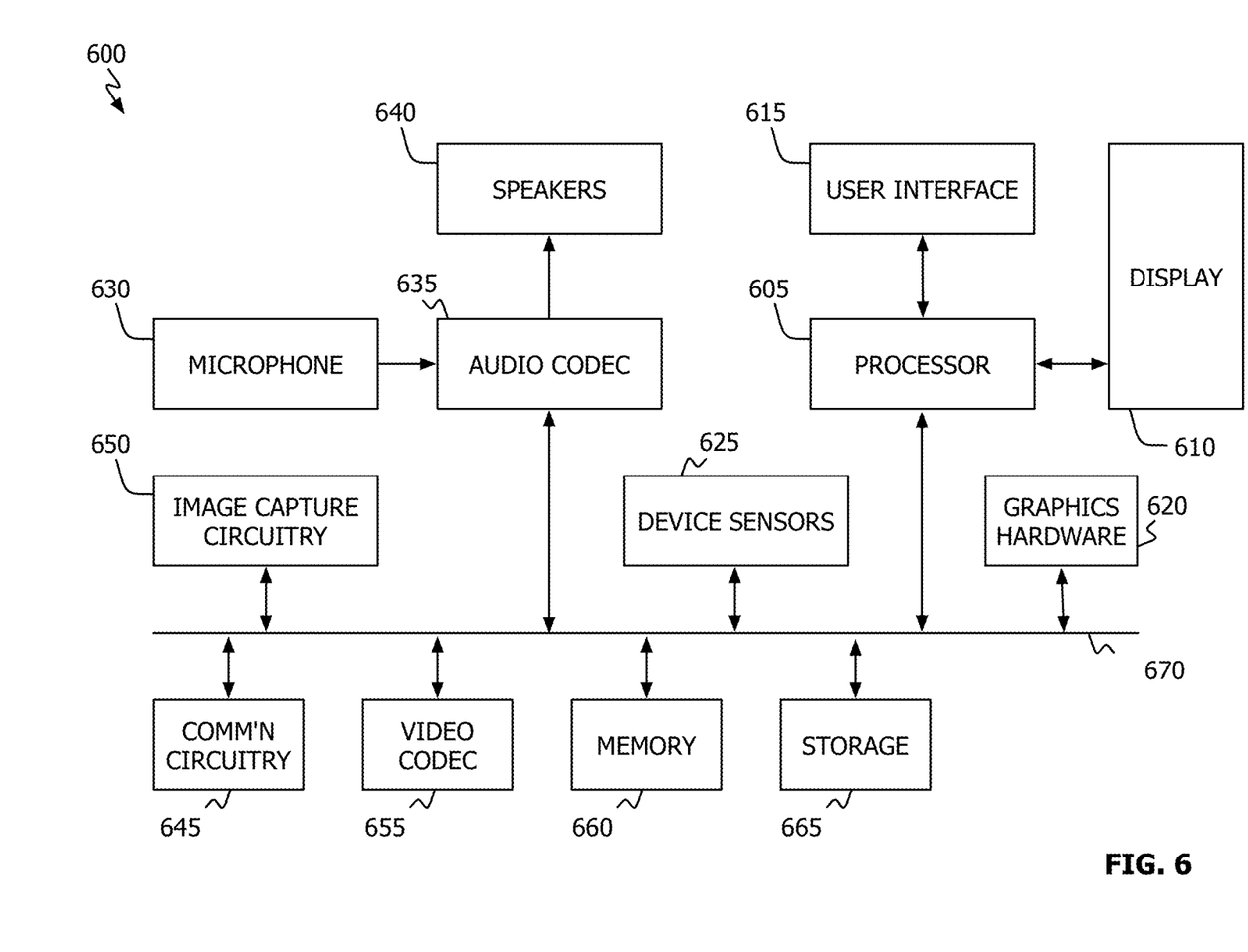
FIG. 6 shows, in block diagram form, a multi-function electronic device in accordance with one embodiment.

Referring to FIG. 6, a simplified functional block diagram of illustrative electronic device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. Electronic device 600 may be, for example, a personal digital assistant (PDA), personal music player, a mobile telephone, or a notebook, laptop or tablet computer system.

Processor 605 may execute instructions necessary to carry out or control the operation of many functions performed by device 600 (e.g., such as the generation and/or processing of images in accordance with operations 100, 300 and 400). Processor 605 may, for instance, drive display 610 and receive user input from user interface 615. User interface 615 can take a variety of forms, such as a button, keypad, dial, a click wheel, keyboard, display screen and/or a touch screen. Processor 605 may be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 process graphics information. In one embodiment, graphics hardware 620 may include a programmable graphics processing unit (GPU).

Sensor and camera circuitry 650 may capture still and video images that may be processed to generate images in accordance with this disclosure. Output from camera circuitry 650 may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605, graphics hardware 620, and image capture circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). For example, the use of quantization levels, G-TMO smoothing, and unsharp mask operations need not be performed. In addition, image operations in accordance with this disclosure may be used to convert HDR color input images to LDR grayscale images by omitting color reconstruction (e.g., block 345 in FIG. 3). Further, some disclosed operations need not be performed in the order described herein and/or may be performed in parallel such as in an image processing pipeline. Further still, the disclosed techniques may be applied to a SV-TMO operating on a LDR image. That is, the techniques disclosed herein may be applied to LDR-to-LDR mapping operations. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors to:
   receive a high dynamic range color input image;
   obtain a grayscale version of the high dynamic range color input image;
   downsample the grayscale version of the high dynamic range color input image to generate a down-sampled grayscale input image;
   apply a spatially varying tone mapping operator (SV-TMO) to the down-sampled grayscale input image to generate a down-sampled grayscale output image;
   determine a global tone mapping operator (G-TMO) based, at least in part, on the down-sampled grayscale input image and the down-sampled grayscale output image; and
   apply the G-TMO to the grayscale version of the high dynamic range color input image to generate a low dynamic range grayscale output image;
   wherein the instructions to determine the G-TMO further comprise instructions to cause the one or more processors to:
      determine a first G-TMO in accordance with a Pool-Adjacent-Violators-Algorithm; and
      apply a smoothing filter to the first G-TMO to generate the G-TMO.

2. The non-transitory program storage device of claim 1, further comprising instructions to cause the one or more processors to convert the low dynamic range grayscale output image to a low dynamic range color output image.

3. The non-transitory program storage device of claim 1, wherein the instructions to cause the one or more processors to obtain a grayscale version of the high dynamic range color input image comprise instructions to cause the one or more processors to obtain a brightness channel of the high dynamic range color input image, wherein the high dynamic range color input image comprises a brightness channel and one or more chrominance channels.

4. The non-transitory program storage device of claim 1, wherein the instructions to cause the one or more processors to generate a down-sampled grayscale input image comprise instructions to cause the one or more processors to generate a thumbnail of the grayscale version of the high dynamic range color input image.

5. The non-transitory program storage device of claim 1, wherein the instructions to cause the one or more processors to determine a global tone mapping operator (G-TMO) comprise instructions to cause the one or more processors to determine a mapping between each pixel in the down-sampled grayscale input image to a corresponding pixel in the down-sampled grayscale output image, wherein the mapping is selected to minimize a specified error criterion.

6. The non-transitory program storage device of claim 5, wherein the specified error criterion comprises a root means squares error criterion.

7. The non-transitory program storage device of claim 1, wherein the instructions to cause the one or more processors to determine the first G-TMO in accordance with a Pool-Adjacent-Violators-Algorithm comprise instructions to cause the one or more processors to quantize values from the down-sampled grayscale input image into a specified number of levels, wherein the specified number of levels is less than the number of possible brightness levels that a pixel in the down-sampled grayscale input image may have.

8. The non-transitory program storage device of claim 1 wherein the instructions to cause the one or more processors to generate a grayscale output image comprise instructions to cause the one or more processors to:
   apply the G-TMO to the grayscale version of the high dynamic range color input image to generate a first grayscale image; and
   perform detail recovery operations on the first grayscale image to generate a grayscale output image.

9. The non-transitory program storage device of claim 8, wherein the instructions to cause the one or more processors to perform detail recovery operations comprise instructions to cause the one or more processors to apply a bilateral filter to a combination of the grayscale version of the high dynamic range color input image and the first grayscale image.

10. The non-transitory program storage device of claim 8 wherein the instructions to cause the one or more processors to generate a grayscale output image comprise instructions to cause the one or more processors to:
   perform detail recovery operations on the first grayscale image to generate a second grayscale image; and
   apply an unsharp mask to the second grayscale image to generate a grayscale output image.

11. The non-transitory program storage device of claim 1, wherein each pixel in the color output image is based, in part, on a ratio of the corresponding pixels in the grayscale output image and the grayscale version of the color input image.

12. A non-transitory program storage device comprising instructions stored thereon to cause one or more processors to:
   obtain a full-resolution high dynamic range color input image (IN);
   obtain a full-resolution grayscale version of image IN (G);
   obtain a down-sampled version of image G (T);
   apply image T to a spatially varying tone mapping operator (SV-TMO) to generate image T';
   determine a global tone mapping operator (G-TMO) based, at least in part, on images T and T', wherein the G-TMO approximates operation of the SV-TMO;
   apply the G-TMO to image G to generate image G';

perform detail recovery operations on image G' to generate image D, wherein performing the detail recovery operations is based, at least in part, on application of a bilateral filter;

determine a full-resolution low dynamic range color output image (O) based, at least in part, on images IN, G and D; and store image O in a memory.

13. The non-transitory program storage device of claim 12, wherein the instructions to cause the one or more processors to obtain a down-sampled version of image G comprise instructions to cause the one or more processors to obtain a thumbnail representation of image G.

14. The non-transitory program storage device of claim 13, wherein the instructions to cause the one or more processors to determine a global tone mapping operator comprise instructions to cause the one or more processors to determine a mapping between each pixel value in image T and a corresponding pixel value in T', wherein the mapping comprises a function $\hat{m}(\ )$ that minimizes $$\sum_{i=1}^{n}(T'_i - \hat{m}(T_i))^2,$$

where n represents the number of pixel values in images T and T', $T_i$ represents the i-th pixel value in image T, and $T'_i$ represents the i-th pixel value in image T'.

15. The non-transitory program storage device of claim 14, wherein the function $\hat{m}(\ )$ that minimizes $$\sum_{i=1}^{n}(T'_i - \hat{m}(T_i))^2,$$

is determined in accordance with a Pool-Adjacent-Value-Algorithm.

16. The non-transitory program storage device of claim 15, further comprising the application of a smoothing filter to the mapping function $\hat{m}(\ )$.

17. The non-transitory program storage device of claim 12, further comprising instructions to cause the one or more processors to apply an unsharp mask to image D to generate image D'.

18. The non-transitory program storage device of claim 17, wherein the instructions to cause the one or more processors to determine a full-resolution low dynamic range color output image (O) comprise instructions to cause the one or more processors to perform a color reconstruction operation based, at least in part, on images IN, G and D'.

19. An electronic device, comprising:
a display element;
a memory operatively coupled to the display element; and
one or more processing units operatively coupled to the display element and the memory, and adapted to execute instructions stored in the memory to:
receive a high dynamic range color input image,
obtain a grayscale version of the color input image,
downsample the grayscale version of the color input image to generate a down-sampled grayscale input image,
apply a spatially varying tone mapping operator (SV-TMO) to the down-sampled grayscale input image to generate a down-sampled grayscale output image,
determine a global tone mapping operator (G-TMO) based;
determining a first G-TMO in accordance with a Pool-Adjacent-Violators-Algorithm; and
applying a smoothing filter to the first G-TMO to generate the G-TMO;
apply the G-TMO to the grayscale version of the color input image to generate a grayscale output image, and
convert the grayscale output image to a low dynamic range color output image.

20. An image conversion method, comprising:
receiving a high dynamic range color input image;
obtaining a grayscale version of the high dynamic range color input image;
down-sampling the grayscale version of the high dynamic range color input image to generate a down-sampled grayscale input image;
applying a spatially varying tone mapping operator (SV-TMO) to the down-sampled grayscale input image to generate a down-sampled grayscale output image;
determining a global tone mapping operator (G-TMO) based on:
determining a first G-TMO in accordance with a Pool-Adjacent-Violators-Algorithm; and
applying a smoothing filter to the first G-TMO to generate the G-TMO; and
applying the G-TMO to the grayscale version of the high dynamic range color input image to generate a low dynamic range grayscale output image.

21. An electronic device, comprising:
a display element;
a memory operatively coupled to the display element; and
one or more processing units operatively coupled to the display element and the memory, and adapted to execute instructions stored in the memory to:
obtain a full-resolution high dynamic range color input image (IN);
obtain a full-resolution grayscale version of image IN (G);
obtain a down-sampled version of image G (T);
apply image T to a spatially varying tone mapping operator (SV-TMO) to generate image T';
determine a global tone mapping operator (G-TMO) based, at least in part, on images T and T', wherein the G-TMO approximates operation of the SV-TMO;
apply the G-TMO to image G to generate image G';
perform detail recovery operations on image G' based, at least in part, on application of a bilateral filter to generate image D;
determine a full-resolution low dynamic range color output image (O) based, at least in part, on images IN, G and D; and
store image O in a memory.

22. The electronic device of claim 21, wherein the instructions to cause the one or more processing units to obtain a down-sampled version of image G comprise instructions to cause the one or more processors to obtain a thumbnail representation of image G.

23. The electronic device of claim 22, wherein the instructions to cause the one or more processing units to determine a global tone mapping operator comprise instructions to cause the one or more processors to determine a mapping between each pixel value in image T and a corresponding pixel value in T', wherein the mapping comprises a function $\hat{m}(\ )$ that minimizes $$\sum_{i=1}^{n}(T'_i - \hat{m}(T_i))^2,$$

where n represents the number of pixel values in images T and T', $T_i$ represents the i-th pixel value in image T, and $T'_i$ represents the i-th pixel value in image T'.

24. The electronic device of claim 23, wherein the instructions to determine the function $\hat{m}()$ that minimizes $$\sum_{i=1}^{n}(T'_i - \hat{m}(T_i))^2,$$

further comprise instructions to cause the one or more processing units to determine the function $\hat{m}()$ in accordance with a Pool-Adjacent-Value-Algorithm.

25. The electronic device of claim 24, wherein the instructions further comprise instructions to cause the one or more processing units to apply a smoothing filter to the mapping function $\hat{m}()$.

26. The electronic device of claim 21, wherein the instructions further comprise instructions to cause the one or more processing units to cause the one or more processors to apply an unsharp mask to image D to generate image D'.

27. The electronic device of claim 26, wherein the instructions to cause the one or more processors to determine a full-resolution low dynamic range color output image (O) further comprise instructions to cause the one or more processing units to cause the one or more processors to perform a color reconstruction operation based, at least in part, on images IN, G and D'.

\* \* \* \* \*